(12) United States Patent
Van Camp et al.

(10) Patent No.: US 6,256,891 B1
(45) Date of Patent: *Jul. 10, 2001

(54) LIGHT DUTY ELECTRIC RECIPROCATING HANDSAW

(76) Inventors: John W. Van Camp, 50 N. Walnut, Mt. Clemens, MI (US) 48043; James L. Van Camp, 24940 Manila, Harrison Township, MI (US) 48045

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/134,179

(22) Filed: Aug. 14, 1998

Related U.S. Application Data
(60) Provisional application No. 60/055,617, filed on Aug. 14, 1997.

(51) Int. Cl.[7] ................................................ B23D 49/16
(52) U.S. Cl. .................................. 30/392; 30/507
(58) Field of Search .............................. 30/392, 393, 394, 30/371, 372, 507, 509; 83/454, 471.1, 743, 744, 745, 547, 574; D8/96, 97, 95

(56) References Cited

U.S. PATENT DOCUMENTS

| | | | |
|---|---|---|---|
| 548,453 | * 10/1895 | Otis | 30/394 |
| 825,321 | * 7/1906 | Hewitt | 30/392 |
| 1,512,781 | * 10/1924 | Masland | 30/392 |
| 2,457,829 | * 1/1949 | Miller | 30/392 |
| 3,273,613 | * 9/1966 | Craven, Jr. | 83/745 |
| 3,864,830 | * 2/1975 | Haddon | 83/745 |
| 4,458,569 | * 7/1984 | McCoubrey | 83/547 |
| 4,592,144 | * 6/1986 | Tolbert et al. | 30/394 |
| 4,785,536 | * 11/1988 | Freyman | 30/124 |
| 5,027,518 | * 7/1991 | Adomatis | 30/392 |
| 5,313,709 | * 5/1994 | Pabon-Delgado | 30/392 |
| 5,435,066 | * 7/1995 | Bare et al. | 30/388 |
| 5,561,909 | * 10/1996 | Berg et al. | 30/392 |
| 5,607,265 | * 3/1997 | Lane | 30/392 |
| 5,692,426 | * 12/1997 | Alexander | 83/466 |
| 5,791,224 | * 8/1998 | Suzuki et al. | 83/488 |

* cited by examiner

Primary Examiner—Rinaldi I. Rada
Assistant Examiner—Melissa L. Hall
(74) Attorney, Agent, or Firm—Lynn E. Cargill

(57) ABSTRACT

A light duty electric reciprocating handsaw includes a body assembly having a throat therein, a removably and reciprocally attached saw blade within the body assembly spanning the opening of the throat so that any workpiece that fits inside the throat can be cut across its width. The handsaw is either electrically or battery operated and includes an electric motor mounted within the body assembly, the weight of the motor being generally distributed over the saw blade. Preferably, the throat of the body assembly is generally defined by an upside down U-shaped configuration for receiving the workpiece therein after cutting with the saw blade. A balance of the weight is located generally over the saw blade, with the remainder of the weight of the unit being distributed generally evenly throughout the rest of the handsaw such that the operator will experience an aid in cutting the workpiece through the force of gravity. A a reciprocating handsaw holder in accordance with the invention includes a bracket for receiving the reciprocating handsaw which is pivotally and slidably mounted to a base which further includes a workpiece assembly support to hold the workpiece in place while the reciprocating handsaw is in operation.

11 Claims, 4 Drawing Sheets

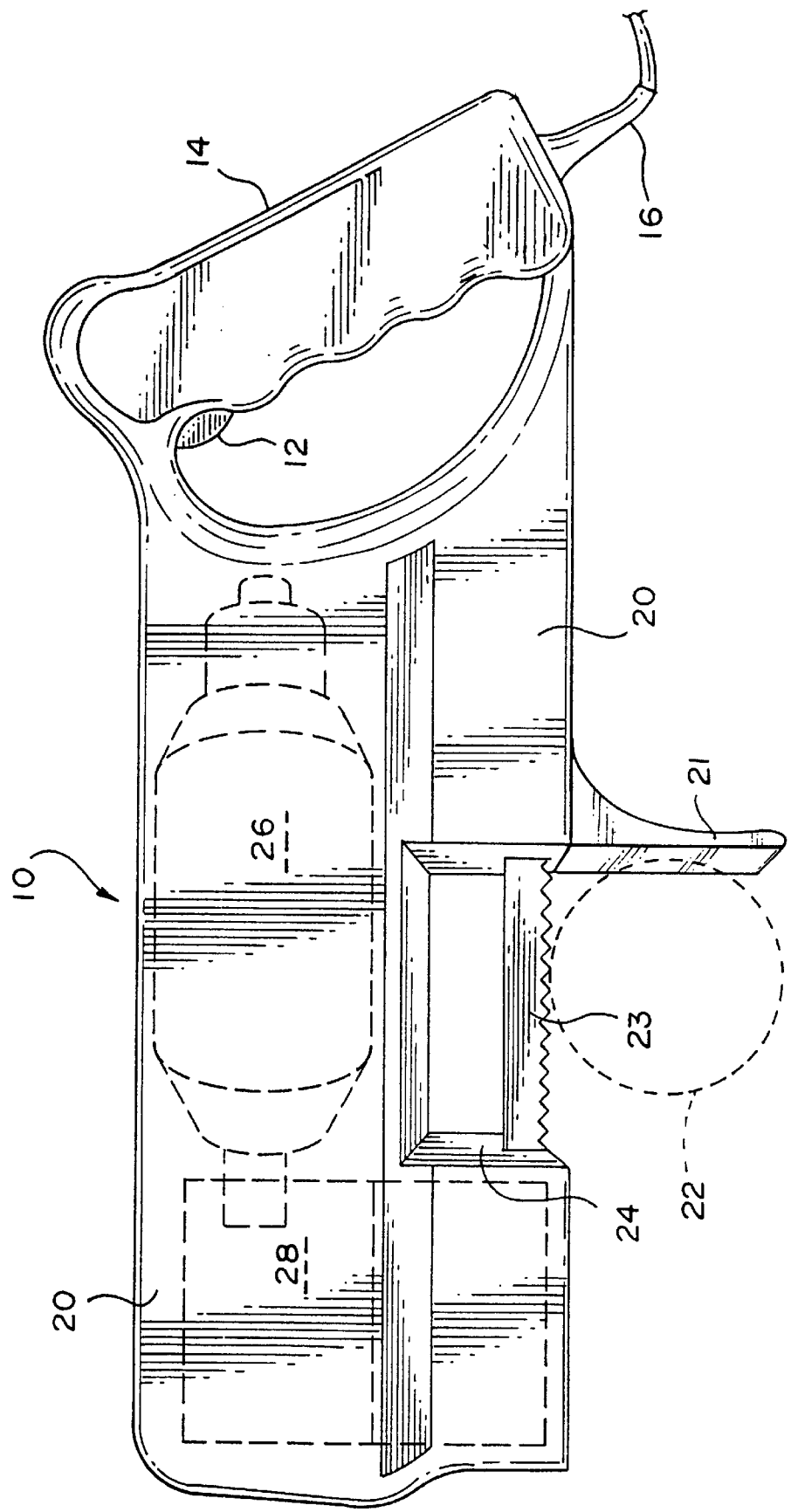

LIGHT DUTY ELECTRIC RECIPROCATING HANDSAW

This application claims the benefit of U.S. Provisional Application No. 60/055,617 filing date Aug. 14, 1997.

TECHNOLOGY FIELD

This invention relates to hand held tools, and more particularly to a light duty electric reciprocating handsaw.

BACKGROUND OF THE INVENTION

Conventional electrically powered hand tools are very convenient for performing small tasks. Larger tasks usually require floor size models of bandsaws and other particular configurations for cutting metal, PVC, wood, and/or any other material. Generally, however, the larger tools tend to have a smaller sized counterpart for use around the house, or in off-site applications for commercial operations. In response to this, the inventors have searched for a hand held version of a cut-off tool, but do not know of any intermediately sized type tool between a portable bandsaw and a hand operated hacksaw.

Conventional tools which have been used to a certain degree of success include a "Sawz-All", or the like. However, due to the fact that the blade of the "Sawz-All" extends outside of the tool itself, without any protection on the other end for a two-handed operation, it is an extremely dangerous tool. Its intended use was for breaking through drywall and other wall materials, although people have been using this tool as a cut-off tool. There is a great need for a small, cut-off tool that has a handle on opposite sides of the blade for safe handling. In other words, there is a need for a smaller, electrically operated portable cut-off tool or hacksaw, without utilizing a very dangerous configuration, especially one that is not likely to hurt the operator if they are inexperienced or not a strong man.

Small cutting operations around the house, such as pipe, moldings, or even a 2×4 stud really only require a small cutoff tool. To date, there does not appear to be a tool that will effectively meet those needs. U.S. Pat. No. 2,206,614 discloses a power hacksaw, although it is inconvenient to use because the weight of the saw is unevenly distributed. U.S. Pat. No. 2,721,586 discloses a power operated reciprocating blade handsaw, which again has the problem of uneven weight distribution, making the tool unwieldy to use. More recently, U.S. Pat. Nos. 5,561,909 and 5,442,857 have issued disclosing a portable powered hacksaw and a battery powered saw, respectively, again with the same weight distribution problem.

Therefore, it would be an advantage to provide a light duty electric reciprocating handsaw for achieving the above objectives.

SUMMARY OF THE INVENTION

In order to accomplish the desired attributes as described, our invention discloses a light duty electric reciprocating handsaw that includes a properly weight-balanced unit with a sufficiently large throat above the reciprocating saw blade to accommodate common household needs, such as a 2×4 stud, painting molding, or pipe common in households and commercial enterprises. Other electric hacksaws in the prior art have improperly balanced the weight distribution such that it would render operations difficult.

Our light duty electric reciprocating handsaw includes a body assembly, or housing, having a throat therein with a reciprocating saw blade attached between the two distal ends of the throat. A motor means is mounted within the body assembly in a position such that the weight is properly balanced. The motor means has a reciprocating output which is connected to the saw blade. The throat of the body assembly is generally defined by an upside-down U-shaped configuration for receiving a workpiece therein after cutting with the saw blade. The balance of the weight is generally located over the saw blade, with the remainder of the weight being distributed generally evenly throughout the rest of the handsaw. With this weight distribution, the operator of the saw will experience an aid in cutting the workpiece through the force of gravity. A downwardly extending skag rests up against the workpiece to secure the blade against the workpiece, so that a more accurate cut can be made in a safe manner.

The reciprocating handsaw may be either electrically powered with a cord or it may be battery powered, utilizing the very popular battery packs which are either rechargeable and interchangeable, or replaceable.

Further disclosed is a holder for the reciprocating handsaw and the workpiece. In order to give the operator a free hand to hold a workpiece, this aspect of the invention can increase the number of cuts made, increase the safety factor, and markedly increase the accuracy of the cuts. The handsaw holder includes a base such as a baseplate, a clamp, a magnetic means, or any other suitable means for holding the reciprocating saw onto a tabletop, or any other desired surface. The holder is pivotally and slidably attachable to the base such that the downwardly extending skag can contact and secure the blade against various sizes and shapes of workpieces. A workpiece support trough is included for holding the workpiece in place while the reciprocating handsaw is slid down and/or over the workpiece to effect the cut. The trough may have an interior surface treatment such as knurling or gridding to help prevent rolling of the workpiece. Tie downs may also be included to hold the workpiece within the workpiece trough.

A reciprocating motor means is also disclosed which includes a grooved rotating cylindrical body having a helical path for the groove. The helical path is a single turn helix rotatable against a stationary rotating bar to give horizontal movement to a groove guide which is affixed through mesne devices to the proximal end of the reciprocating saw blade.

BRIEF DESCRIPTION OF THE DRAWINGS

FIG. 1A is a side elevational view of the light duty electric reciprocating handsaw powered by an electric cord in accordance with the present invention;

DETAILED DESCRIPTION OF THE INVENTION

Figure 1B:
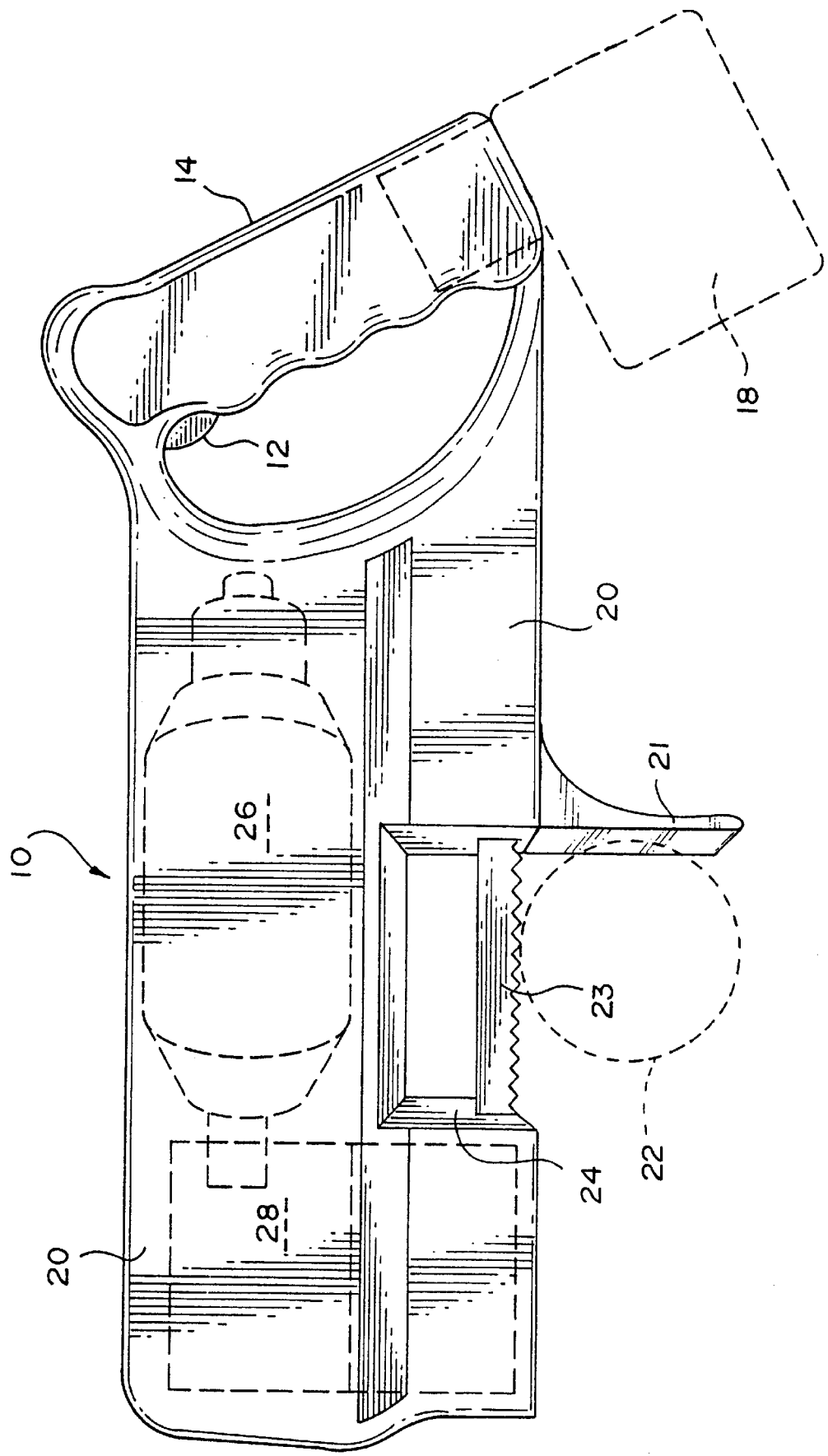
FIG. 1B is a side elevational view of the light duty electric reciprocating handsaw powered by a battery pack.
Figure 2:
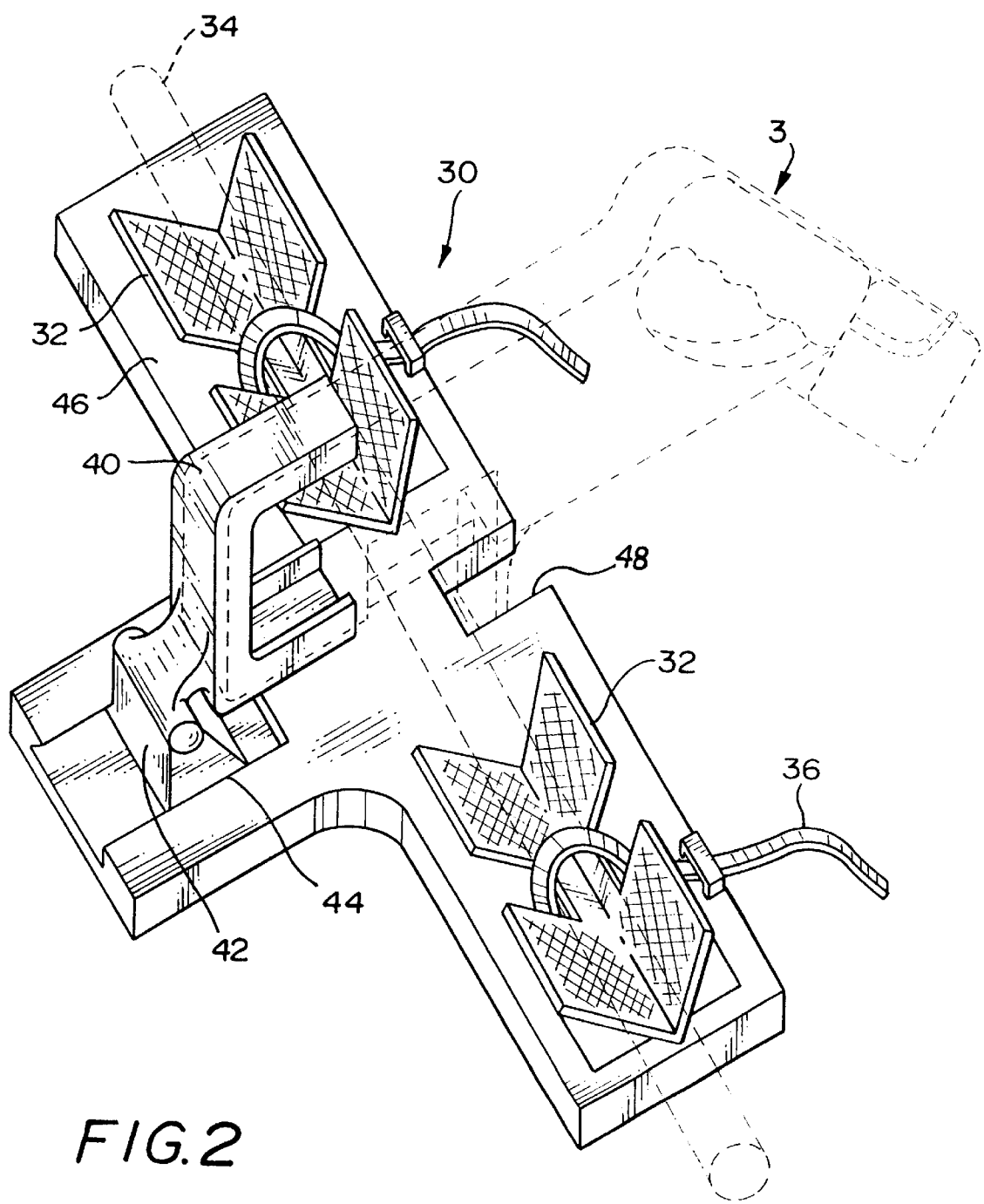
FIG. 2 is a perspective view of the reciprocating handsaw holder in accordance with the present invention.

In accordance with the present invention, there is generally shown a light duty electric reciprocating handsaw which meets all of the objectives and advantages described above. Also disclosed is a tabletop holder for the reciprocating handsaw in order to allow a free hand for the operator. Referring first to FIG. 1A, there is a reciprocating handsaw generally denoted by the numeral 10. Handsaw 10 is operated by a trigger mechanism 12 enclosed within a handle 14 attached to an electrical source cord 16. A body assembly 20 may be made of a light weight plastic or a metal or any other suitable material. A skag 21 extends downwardly from the body assembly housing 20 which rests up against the workpiece being cut. The length of skag 21 should be adapted to extend midway down the longest possible workpiece 22 that is anticipated for use with the handsaw 10. Reciprocating blade 23 extends between the proximal and distal ends of the throat 24 for receiving the workpiece 22 as it is being cut. Motor 26 is encased within the body assembly housing 20 with an evenly distributed weight distribution over saw blade 23. Reciprocating means 28 is shown in a black box configuration and is described in more detail hereinbelow with reference to FIG. 3. FIG. 1B is the same illustration as FIG. 1A, with the exception of the power source being a battery pack 18 as shown Referring now to FIG. 2, a reciprocating handsaw holder is generally denoted by numeral 30. A workpiece support 32 is shown here in its preferred configuration, ie. as a V-shaped trough for holding workpiece 34, here shown as a pipe. Workpiece support 32 may have a knurled or other surface textured treatment, such as a metal file to prevent rolling of the workpiece during the cutting operation. Tie-downs 36 are incorporated to hold workpiece 34 in place during the operation. Base 46 is shown here preferably as a table top model, although it may be a clamp, a magnetic means, or a table top on a rolling workbench. Pivotal and slidable mount 42 attaches the handsaw holding bracket 40 onto the base 46 by a sliding mechanism 44.

In operation, the handsaw is placed and secured within bracket 40, either temporarily and frictionally, or more permanently by set screws. As the handsaw is pivotally mounted via pivotally and slidably mounted plate 42 onto base 46, handsaw 34 can be put into position over workpiece 34 in order to effect the cutting operation. Skag opening 48 is adapted to accommodate the skag at the bottom of the handsaw in order to accommodate numerous sizes of workpiece 34. For example, if workpiece 34 is a 2×4, it will be cradled within workpiece support 32. The handsaw can be slidably positioned so as to make a perfect and accurate cut of workpiece 34.

Figure 3:
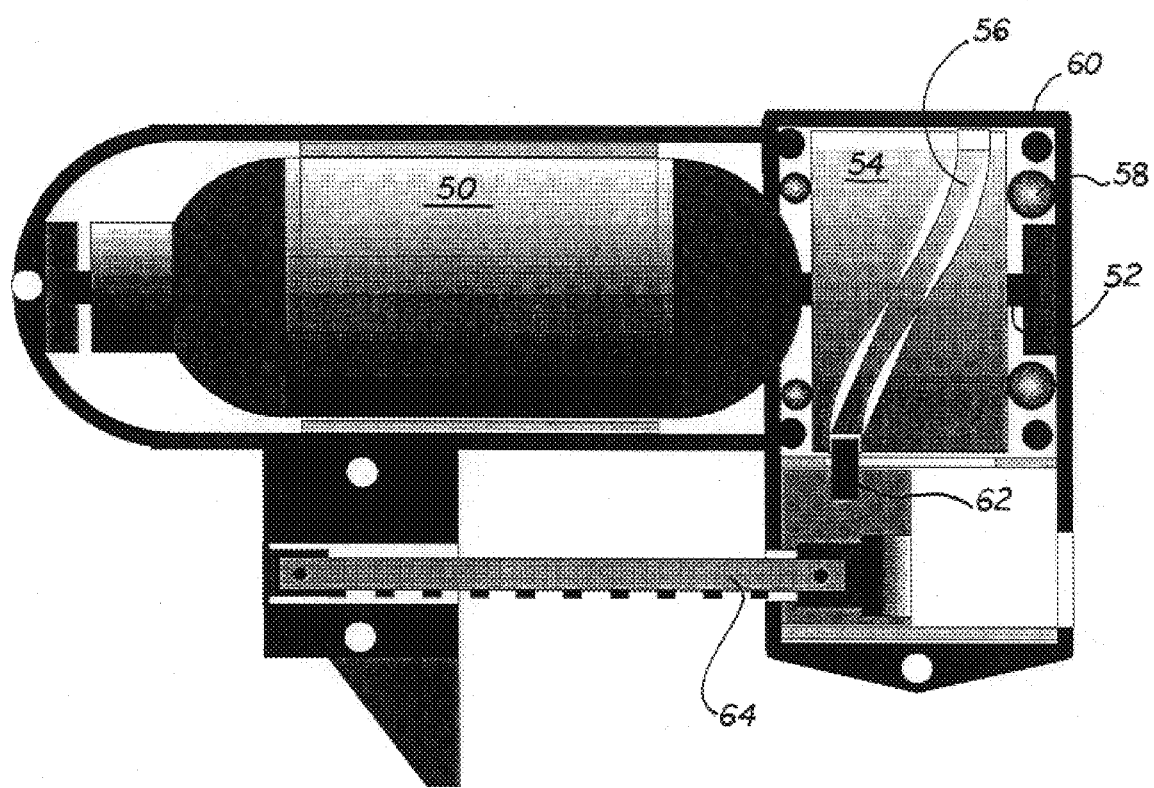
FIG. 3 shows a preferred configuration of the reciprocating means in accordance with the present invention.

Looking now to FIG. 3, there is shown a portion of the handsaw (handle not shown). The motor is indicated as numeral 50, and permanently attached thereto is a rotatable shaft 52 to be driven by motor 50. Shaft 52 is also permanently affixed to cylindrical body 54, which in turn rotates with shaft 52. Single turn helical groove 56 is cut into cylindrical body 54. Bearings 58 control the travel of cylindrical body 54 against housing 60. Groove guide follower 62 rides through the groove 56 during operation, which acts to effect a reciprocating horizontal motion of saw blade 64, through mesne attachments. Groove guide follower 62 is allowed to move back and forth within housing 60 in a piston-like motion. The weight of the cylindrical body 54 and the motor 50 are balanced to maintain a weight distribution over saw blade 64, so as to aid the operator during the cutting operation.

The weight distribution of the saw over the saw blade decreases the need to use both hands during operation, because gravitational force urges the handsaw onto the workpiece to be cut. A weight-balanced tool helps the cutting because less downward force needs to be exerted by the operator. This factor makes for easier cuts such that nearly anyone in the household can pick up the tool and make small cuts on workpieces.

Therefore, the present invention discloses a light duty reciprocating handsaw which meets or exceeds the advantages and objectives described above. While the invention has been described in particularity, these descriptions are meant to be merely illustrative, and the scope of the invention shall only be limited by the appending claims.

What is claimed is:

1. A light duty reciprocating handsaw, comprising:

a body assembly having a throat opening therein and a substantially longitudinal axis extending through the body assembly; a saw blade removably and reciprocally attached within the body assembly, said saw blade having a proximal end and a distal end, said saw blade spanning the opening of the throat so that any workpiece that fits inside the throat can be cut across its width; an electric motor mounted over the saw blade within said body assembly so that the motor is mounted within the body assembly along the substantially longitudinal axis and intersecting a line extending perpendicular to the sawblade between a midpoint in the sawblade and a midpoint of the throat opening, thereby generally balancing the weight of the entire handsaw over the saw blade to facilitate its ease of handling, said motor being connected to the saw blade; said throat of the body assembly being generally defined by an upside down U-shaped configuration for receiving a workpiece therein after cutting with the saw blade; such that the operator of the saw will experience an aid in cutting the workpiece through the force of gravity.

2. The handsaw of claim 1, wherein the body assembly is made of a lightweight plastic housing.

3. The handsaw of claim 1, further comprising a skag extending downwardly from the body assembly.

4. The handsaw of claim 1, wherein said saw blade may include a hacksaw blade.

5. The handsaw of claim 1, wherein the electric motor is powered by an electric cord.

6. The handsaw of claim 1 wherein said electric motor is powered by a battery.

7. The handsaw of claim 1, wherein said throat of the body assembly is adapted to receive a standard building material selected from the group consisting of a standard 2×4 stud, pipes, PVC, aluminum pieces, and steel.

8. A combination of a handsaw holder and a portable light duty electric reciprocating handsaw, said handsaw holder being adapted for removably engaging the portable light duty electric reciprocating handsaw, comprising:

a supporting base for supporting the handsaw holder on a surface;

an individual holding bracket adapted for securing the nose portion of the portable light duty electric reciprocating handsaw, said bracket being adapted for the electric reciprocating handsaw;

a pivoting and sliding base mount connecting the supporting base in a pivoting and sliding fashion to the holding bracket, such that it is possible to position the light duty electric reciprocating handsaw over the workpiece to be cut;

a workpiece support for supporting and holding the workpiece independently from the operator of the handsaw, such that the workpiece is held in place by the workpiece support, without the handsaw operator having to hold the workpiece with his hand, thereby giving the operator a free hand while enhancing the accuracy of the cut and the safety of the operation; and a handsaw which includes a body assembly having a throat opening therein with a substantially longitudinal axis extending through the body assembly; said body assembly including a nose portion; a saw blade removably and reciprocally attached within the body assembly, said saw blade having a proximal end and a distal end, said saw blade spanning the opening of the throat so that any workpiece that fits inside the throat can be cut across its width; an electric motor mounted over the saw blade within said body assembly so that the motor is mounted within the body assembly along the substantially longitudinal axis and intersecting a line extending perpendicular to the saw blade between a midpoint in the saw blade and a midpoint of the throat opening, thereby generally balancing the weight of the entire handsaw over the saw blade to facilitate its ease of handling, said throat of the body assembly being generally defined by an upside down U-shaped configuration for receiving a workpiece therein after cutting, said bracket being adapted for holding said handsaw in such a manner as to position the blade of the handsaw over a workpiece to be cut.

9. The combination of claim 8, wherein the holding bracket is generally U-shaped to receive the handsaw.

10. The combination of claim 8, further comprising tie downs for securing the workpiece within the workpiece support.

11. The combination of claim 8, wherein said workpiece support has a textured surface to prevent the workpiece from moving during the cutting operation.

\* \* \* \* \*